(12) United States Patent
De Haan

(10) Patent No.: US 7,623,738 B2
(45) Date of Patent: Nov. 24, 2009

(54) METHOD, APPARATUS AND A UNIT FOR IMAGE CONVERSION

(75) Inventor: Gerard De Haan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 532 days.

(21) Appl. No.: 10/535,057

(22) PCT Filed: Oct. 27, 2003

(86) PCT No.: PCT/IB03/04796

§ 371 (c)(1),
(2), (4) Date: May 13, 2005

(87) PCT Pub. No.: WO2004/047021

PCT Pub. Date: Jun. 3, 2004

(65) Prior Publication Data

US 2006/0056735 A1    Mar. 16, 2006

(30) Foreign Application Priority Data

Nov. 19, 2002   (EP)   .................................. 02079796

(51) Int. Cl.
*G06K 9/40* (2006.01)
*G06K 9/32* (2006.01)

(52) U.S. Cl. ...................................... 382/299; 382/254
(58) Field of Classification Search .................. 382/299
See application file for complete search history.

(56) References Cited

U.S. PATENT DOCUMENTS

| | | | | |
|---|---|---|---|---|
| 5,309,526 A | * | 5/1994 | Pappas et al. | ................ 382/237 |
| 6,341,181 B1 | * | 1/2002 | Greivenkamp et al. | ...... 382/260 |
| 6,592,523 B2 | * | 7/2003 | Avinash et al. | .............. 600/443 |
| 7,239,424 B1 | * | 7/2007 | Berkner et al. | ................ 358/2.1 |

FOREIGN PATENT DOCUMENTS

WO    WO0161989 A1    8/2001

* cited by examiner

*Primary Examiner*—Bhavesh M Mehta
*Assistant Examiner*—Hadi Akhavannik

(57) ABSTRACT

An image conversion unit for converting a first image with a first resolution into a second image with a second resolution, the second resolution being higher than the first resolution being higher than the first resolution is disclosed. The image conversion unit comprises a noise generator for generating noise and a combining unit arranged to add the noise to the second image. Preferably the noise that is added comprises spectral components which are in a part of a frequency spectrum which is above the Nyquist frequency of the first image. Optionally the image conversion unit comprises a noise measurement unit to control the noise generator. FIG. 5A+5B+5C

10 Claims, 5 Drawing Sheets

METHOD, APPARATUS AND A UNIT FOR IMAGE CONVERSION

Figure 1:
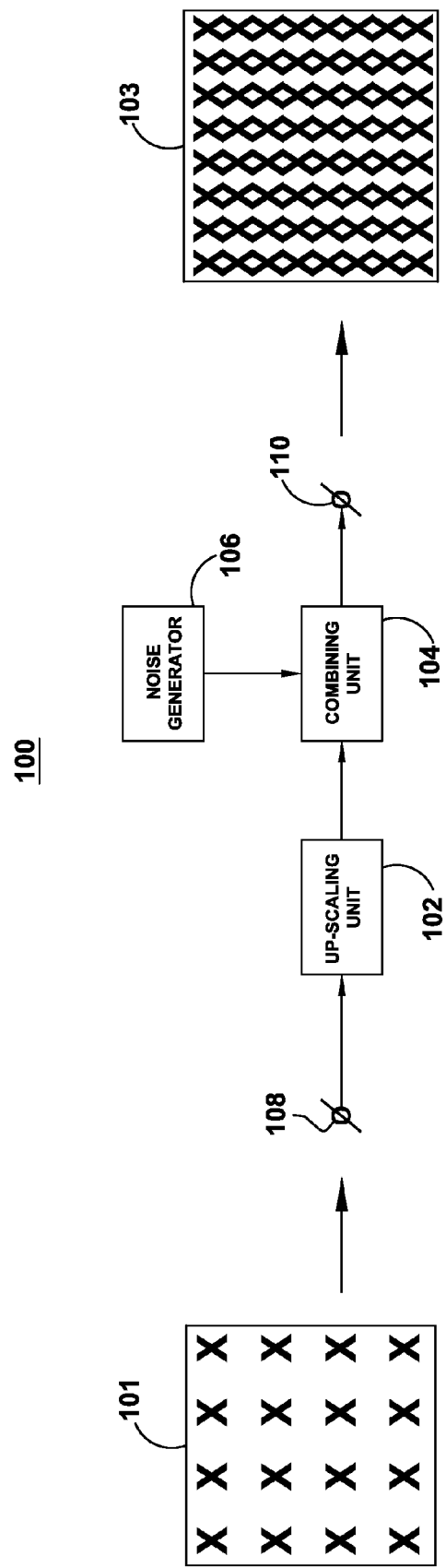

The invention relates to an image conversion unit for converting a first image with a first resolution into a second image with a second resolution, the second resolution being higher than the first resolution.

The invention further relates to an image processing apparatus comprising:
- receiving means for receiving a signal corresponding to a first image; and
- such an image conversion unit for converting the first image into a second image.

The invention further relates to a method of converting a first image with a first resolution into a second image with a second resolution, the second resolution being higher than the first resolution.

The advent of HDTV emphasizes the need for spatial up-conversion techniques that enable standard definition (SD) video material to be viewed on high definition (HD) television (TV) displays. Conventional techniques are linear interpolation methods such as bi-linear interpolation and methods using poly-phase low-pass interpolation filters. The former is not popular in television applications because of its low quality, but the latter is available in commercially available ICs.

Additional to the conventional linear techniques, a number of non-linear algorithms have been proposed to achieve this up-conversion. Sometimes these techniques are referred to as content-based or edge dependent spatial up-conversion. Some of the techniques are already available on the consumer electronics market.

With the known up-conversion methods, the number of pixels in the frame is increased, but the perceived sharpness of the image is not or hardly increased. Although the non-linear methods perform better than the linear methods, in this aspect, many up-converted images often look flat or unnatural. In other words, the capability of the display is not fully exploited.

It is an object of the invention to provide an image conversion unit of the kind described in the opening paragraph, which is arranged to produce natural looking sharp images.

This object of the invention is achieved in that the image conversion unit is arranged to add noise to the second image. The noise to be added might be generated by means of a random generator which is comprised by the image conversion unit, but alternatively the noise is generated externally and provided to the image conversion unit via an input connector of the image conversion unit. Preferably the noise that is added comprises spectral components which are in a part of a frequency spectrum above the Nyquist frequency of the first image, i.e. the spectral components have a frequency above the Nyquist frequency of the first image. The inventor has observed that an up-scaled image, i.e. up-converted image with the second resolution to which no noise has been added, hardly comprises energy in the two-dimensional frequency spectrum above the Nyquist frequency of the first image. Assume that the first image is a digital image achieved by sampling an analog input image, with a sampling frequency equal to two times the Nyquist frequency of the analog input image. Further assume that the second resolution equals two times the first resolution, i.e. the first image is scaled with a factor two to achieve the second image. In that case the spectrum of the second image has an upper bound which is also a factor two higher than the Nyquist frequency of the first image. However when inspecting the frequency components in the spectrum of the second image it appears that most energy is in the lower part of the spectrum, that means in the range below the Nyquist frequency of the first image. In general, new created spectral components in the spectrum of the second image above the Nyquist frequency of the first image, correspond with regions in the first image near existing edges. By increasing the steepness of these edges, spectral components are generated which are typically above the Nyquist frequency of the first image. However there are hardly any "high frequency" spectral components, i.e. belonging to the spectrum of the second image above the Nyquist frequency of the first image, created by means of the up-conversion, which correspond to plain areas of the first image. By adding "high frequency" noise to an up-converted intermediate image, the final output image of the image conversion unit according to the invention is a natural looking sharp image.

In principle, the added noise can be white noise but preferably the noise that is added is colored noise. An advantage of adding colored noise, that means selectively adding pre-determined frequency components, is that the image quality is increased because of enhanced sharpness, while at the other hand the image quality is not decreased because of an observable noisiness. An embodiment of the image conversion unit according to the invention is characterized in that the noise that is added comprises further spectral components which are in another part of the frequency spectrum which is below the Nyquist frequency of the first image, the total energy of the spectral components belonging to the spectrum above the Nyquist frequency of the first image being higher than the total energy of the further spectral components. In other words, the added noise primarily comprises components above the Nyquist frequency of the first image.

In an embodiment of the image conversion unit according to the invention the amount of noise that is added is based on a noise measurement. Preferably the noise measurement is performed on basis of the first image. The noise measurement might be performed by means of a noise measurement unit which is comprised by the image conversion unit, but alternatively the present amount of noise is measured by means of a noise measurement unit that is located externally. In the latter case the image conversion unit is provided with a noise control signal indicating the amount of noise, i.e. the present noise level. An advantage of this embodiment according to the invention is that the amount of enhancement is adapted to the image content. For instance, in the case of a first image with a relatively low amount of noise, the amount of added noise, i.e. the amount of enhancement should be relatively small to prevent the second image to become too noisy.

An embodiment of the image conversion unit according to the invention comprises a spatial enhancement filter for enhancing structures of an intermediate image which is based on the first image and which has the second resolution, the enhancing resulting into the second image. Besides enhancement by means of addition of noise it is advantageous to apply other means of enhancement. These other means of enhancement include algorithms for increasing the amplitude of the high/or middle frequencies using linear filtering methods, usually short FIR-filters. But they also include non-linear techniques to increase the steepness of edges, also referred as luminance transient improvement (LTI). These other means of enhancement are arranged to enhance structures present in the first image, while the addition of noise primarily plays a role in enhancing areas with hardly any texture.

It is a further object of the invention to provide a method of the kind described in the opening paragraph for producing natural looking sharp images.

This object of the invention is achieved in that in the method according to the invention noise is added to the second image.

It is a further object of the invention to provide an image processing apparatus of the kind described in the opening of which the image conversion unit is arranged to produce natural looking sharp images.

This object of the invention is achieved in that the image conversion unit of the image processing apparatus is arranged to add noise to the second image. The image processing apparatus optionally comprises a display device for displaying the second image. The image processing apparatus might e.g. be a TV, a set top box, a VCR (Video Cassette Recorder) player or a DVD (digital Versatile Disk) player. Modifications of image conversion unit and variations thereof may correspond to modifications and variations thereof of the method and of the image processing apparatus described.

Figure 2:
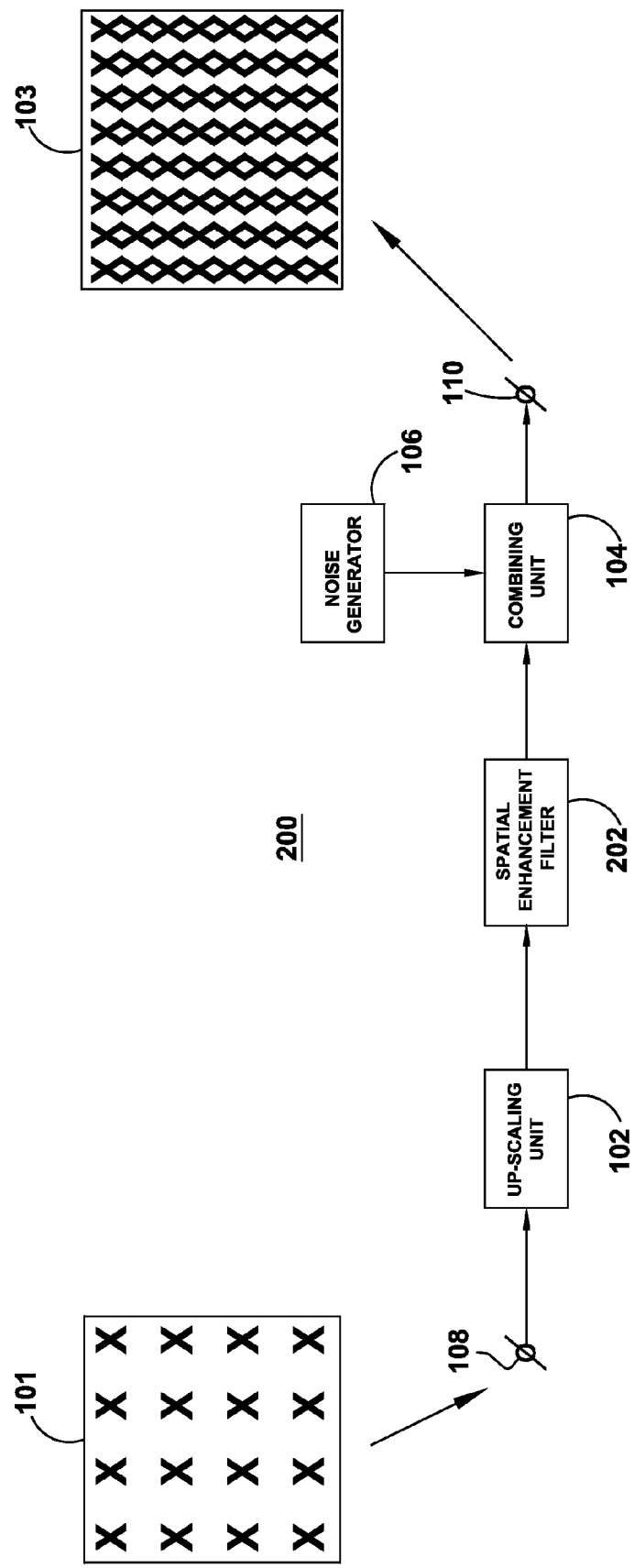
Figure 3:
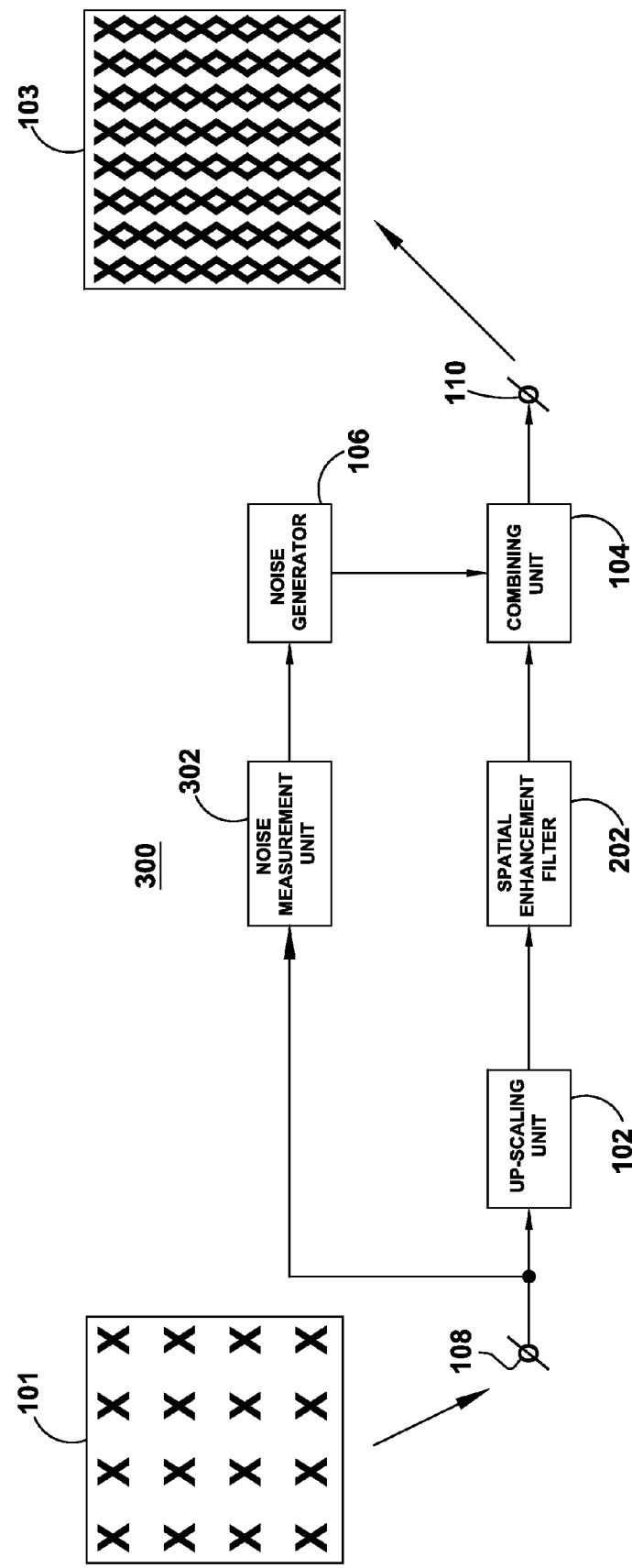
Figure 4:
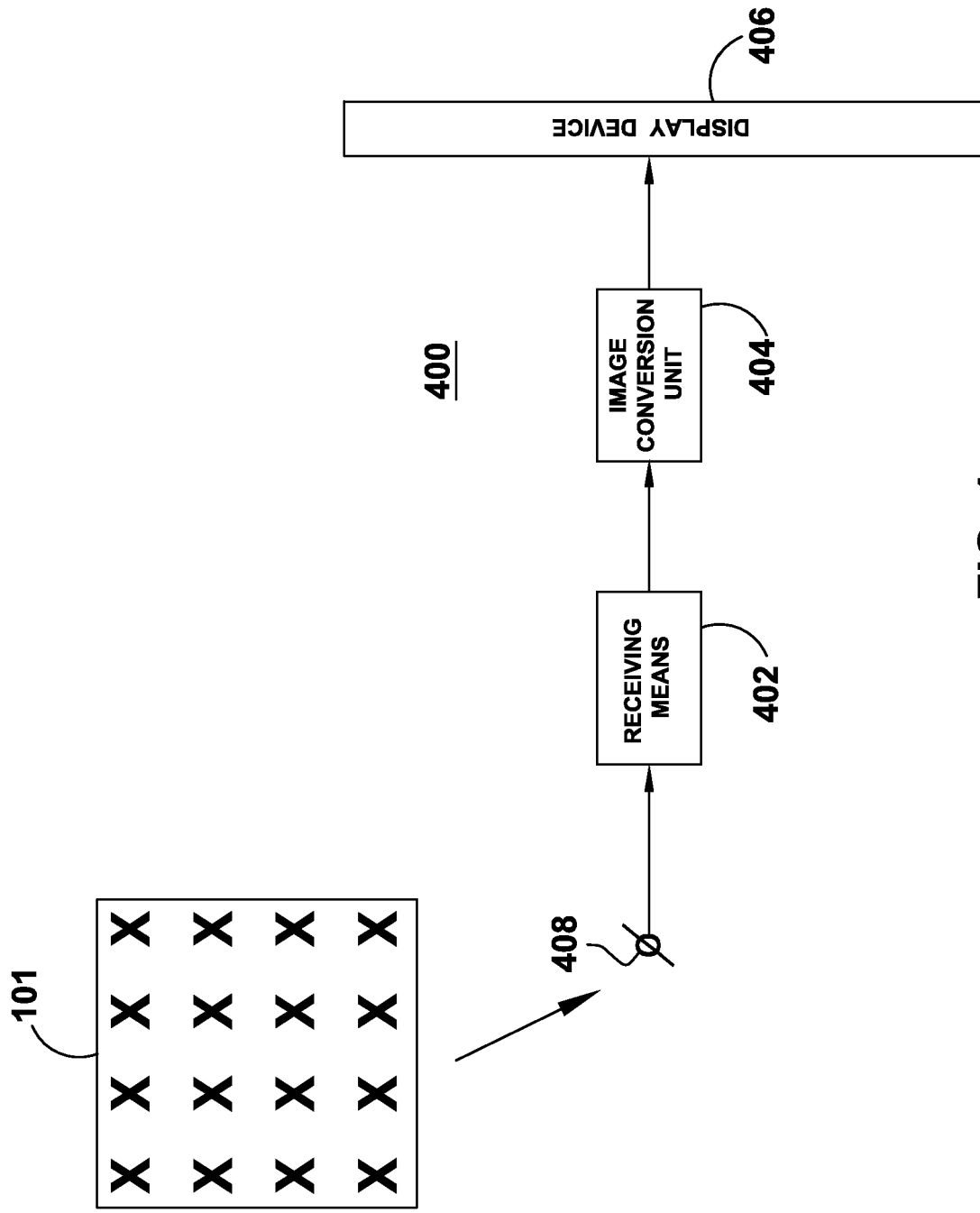
Figure 5A:
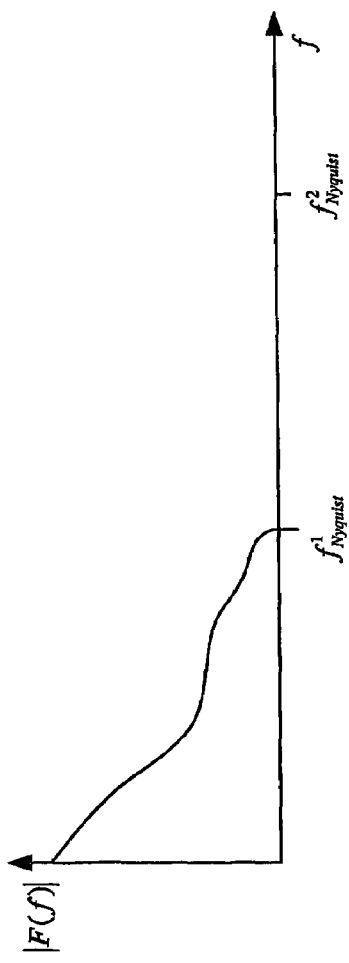
Figure 5B:
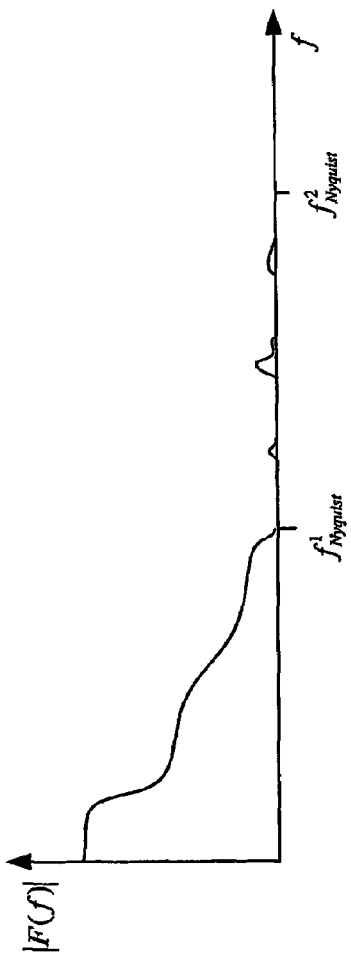
Figure 5C:
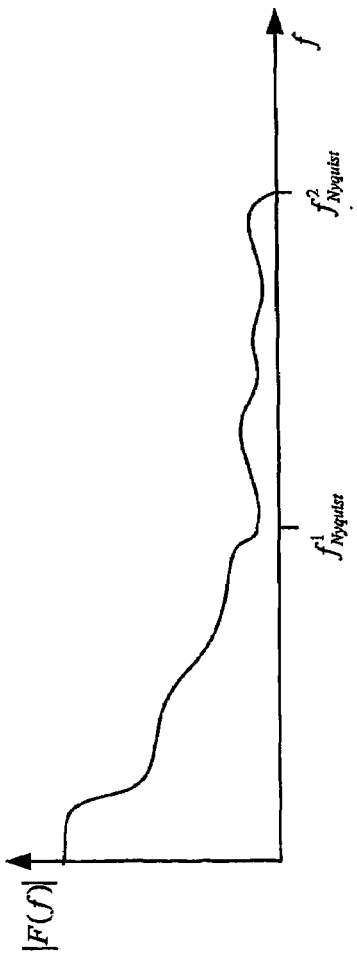

These and other aspects of the image conversion unit, of the method and of the image processing apparatus according to the invention will become apparent from and will be elucidated with respect to the implementations and embodiments described hereinafter and with reference to the accompanying drawings, wherein:

FIG. 1 schematically shows an embodiment of the image conversion unit according to the invention;

FIG. 2 schematically shows an embodiment of the image conversion unit according to the invention, comprising a spatial enhancement filter;

FIG. 3 schematically shows an embodiment of the image conversion unit according to the invention, comprising a noise measurement unit;

FIG. 4 schematically shows an embodiment of the image processing apparatus according to the invention;

FIG. 5A schematically shows the frequency spectrum of an input SD image;

FIG. 5B schematically shows the frequency spectrum of an intermediate HD image; and FIG. 5C schematically shows the frequency spectrum of an output HD image. Same reference numerals are used to denote similar parts throughout the figures.

FIG. 1 schematically shows an embodiment of the image conversion unit 100 according to the invention. The image conversion unit 100 is provided with a video signal representing standard definition (SD) images, e.g. 101, at the input connector 108 and provides high definition (HD) images, e.g. 103, at the output connector 110. The image conversion unit 100 comprises:

an up-scaling unit 102 which is arranged to compute an intermediate image by means of interpolation of pixel values being extracted from the input SD images;

a noise generator 106 which is arranged to generate a noise signal. The noise signal might be in the form of a two-dimensional matrix of luminance values, with the dimensions of the matrix equal to the dimensions of the intermediate image. The noise generator 106 is provided with the resolution of the SD images and the resolution of the HD images. On basis of these two resolutions the preferred lower and upper bound, respectively of the frequency spectrum of the noise is determined; and a combining unit 104 which is arranged to combine the intermediate image from the up-scaling unit 102 with the noise signal being generated by the noise generator 106. This combining unit 104 might be a straightforward adding unit which is arranged to add pixel values of the intermediate image with the respective values of the two-dimensional matrix as provided by the noise generator 106.

The up-scaling unit 102 is arranged to perform an interpolation by means of fixed interpolation coefficients. Alternatively, the-interpolation coefficients are determined on basis of the image content. Examples of such non-linear up-scaling methods are e.g. described in the article "Towards an overview of spatial up-conversion techniques", by Meng Zhao et al., in the proceedings of the SCE 2002, Erfurt, Germany, 23-26 Sep. 2002.

It will be clear that the added noise is created on purpose. That means that with adding noise is meant an explicit action requiring the creation of noise as an additional operation. Certain operations inherently introduce noise, e.g. because of quantization, truncation or a physical phenomena. With adding noise is not meant these types of inherently introducing noise.

The up-scaling unit 102, the noise generator 106 and the combining unit 104 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

FIG. 2 schematically shows an embodiment of the image conversion unit 200 according to the invention, comprising a spatial enhancement filter 202. The intermediate image being computed by the up-scaling unit 102 is provided to the spatial enhancement filter 202. The output of the spatial enhancement filter 202 is combined with the noise signal from the noise generator 106. The spatial enhancement filter 202 is arranged to perform one of the sharpness improvement methods as described in chapter 2 of the book "Video Processing for multimedia systems", by G. de Haan, University Press Eindhoven. Optionally the sequence of processing steps differs from what is described above in connection with the depicted block diagram. E.g. the spatial enhancement filter 202 might be connected to the output of the combining unit 104 instead of to the input.

FIG. 3 schematically shows an embodiment of the image conversion unit 300 according to the invention, comprising a noise measurement unit 302. The noise measurement unit 302 is designed to control the noise generation unit 108. That means that the amplitude of the noise signal is based on the measurement amount of noise. In the case of video data the noise level can be computed on basis of information-free time-slots in the image data stream (blanking). As the only signal in these time slots is the noise, it can be measured straightforwardly. See "Interfield noise and cross color reduction IC for flicker free TV receivers", by T. Grafe et al., in IEEE Transactions on Consumer Electronics, Vol. 34, No. 3, August 1988, pages 402-408. Alternatively the amount of noise is computed on basis of the images, e.g. by calculating the variance from a large number of areas in an image. This approach is explained in more detail in chapter 3 of the book "Video Processing for multimedia systems", by G. de Haan, University Press Eindhoven. It should be noted that it is possible that the noise level is measured in an image of a series of input images and subsequently applied to control the addition of noise in other images of this series of input images.

In general, the control of the noise generator 106 is such that the amount of noise that is added to the intermediate image is relatively high if the level of measured noise is relatively high. However the relation between these two quantities does not have to be linear. Besides that, the level of measured noise might also be applied to control the spectrum of the added noise. Optionally, multiple noise level measurements are performed, each focussing on distinct parts of the frequency spectrum of the first image. By doing this, the control of the spectrum of the added noise can be further improved.

FIG. 4 schematically shows an embodiment of the image processing apparatus 400 according to the invention, comprising:

Receiving means 402 for receiving a signal representing SD images. The signal may be a broadcast signal received via an antenna or cable but may also be a signal from a storage device like a VCR (Video Cassette Recorder) or Digital Versatile Disk (DVD). The signal is provided at the input connector 408;

The image conversion unit 404 as described in connection with any of the FIGS. 1-3; and A display device 406 for displaying the HD output images of the image conversion unit 404. This display device 406 is optional.

The image processing apparatus 400 might e.g. be a TV. Alternatively the image processing apparatus 400 does not comprise the optional display device but provides HD images to an apparatus that does comprise a display device 406. It that case, the image processing apparatus 400 might be e.g. a set top box, a satellite-tuner, a VCR player or a DVD player. But it might also be a system being applied by a film-studio or broadcaster.

Now, the effect in the frequency domain of the up-conversion and of the addition of noise will be illustrated by means of an example. See FIGS. 5A, 5B and 5C. FIG. 5A schematically shows the frequency spectrum |F(f)| of an input SD image. As can be seen, there are no spectral components above the Nyquist frequency $f_{Nyquist}^1$ of this input SD image. FIG. 5B schematically shows the frequency spectrum of the intermediate HD image, which is based on the input SD image. The intermediate HD image has been computed by means of interpolation of pixel values being extracted from the input SD image. Although the resolution of this intermediate HD is higher than the resolution of the input SD image of which it is derived, there are hardly any spectral components above the Nyquist frequency $f_{Nyquist}^1$ of the input SD image. In this example a non-linear up-scaling unit 102 is applied in combination with a spatial enhancement filter 202. FIG. 5C schematically shows the frequency spectrum of the output HD image which comprises the added noise with frequency components in the range above the Nyquist frequency $f_{Nyquist}^1$ of the input SD image.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. An image conversion unit for converting a first image with a first resolution into a second image with a second resolution, the second resolution being higher than the first resolution, the image conversion unit comprising:

an image converter for converting a first image with a first resolution into an intermediate image with a second resolution, the second resolution being higher than the first resolution;

a noise adder for adding noise to the intermediate image, wherein the said noise comprises spectral components that are in a part of a frequency spectrum that is above the Nyquist frequency of the first image; and a spatial enhancement filter for enhancing structures of said intermediate image which is based on the first image and which has the second resolution, wherein a combination of said noise adder and said spatial enhancement filter forms said second image.

2. The image conversion unit as claimed in claim 1, further comprising a noise generator.

3. The image conversion unit as claimed in claim 2, wherein the noise generator generates colored noise.

4. The image conversion unit as claimed in claim 3, wherein the noise generator generates colored noise that comprises further spectral components which are in another part of the frequency spectrum which is below the Nyquist frequency of the first image, the total energy of the spectral components being higher than the total energy of the further spectral components.

5. The image conversion unit as claimed in claim 1, wherein the amount of added noise is based on a noise measurement.

6. The image conversion unit as claimed in claim 1, wherein the enhancing performed by the spatial enhancement filter results in the second image having increased perceived sharpness.

7. A method of converting a first image with a first resolution into a second image with a second resolution, the second resolution being higher than the first resolution, the method comprising acts of:

converting a first image with a first resolution into an intermediate image with a second resolution, the second resolution being higher than the first resolution;

adding noise to the intermediate image, wherein the said noise comprises spectral components that are in a part of a frequency spectrum that is above the Nyquist frequency of the first image; and enhancing structures of the intermediate image which is based on the first image and which has the second resolution, wherein a combination of said adding noise act and said enhancing structures act forms said second image.

8. An image processing apparatus comprising:

receiving means for receiving a signal corresponding to a first image, said first image having a first resolution;

an image conversion unit for converting the first image into an intermediate image having a second resolution greater than said first resolution;

a noise adder for adding noise to the intermediate image, said noise comprising spectral components that are in a part of a frequency spectrum that is above the Nyquist frequency of the first image; and a spatial enhancement filter for enhancing structures of said noise-added intermediate image which is based on the first image and which has the second resolution, thereby forming a second image.

9. The image processing apparatus as claimed in claim 8, further comprising a display device for displaying the second image.

10. The image processing apparatus as claimed in claim 9, wherein the image processing apparatus is a TV.

* * * * *

UNITED STATES PATENT AND TRADEMARK OFFICE
CERTIFICATE OF CORRECTION

PATENT NO. : 7,623,738 B2  Page 1 of 1
APPLICATION NO. : 10/535057
DATED : November 24, 2009
INVENTOR(S) : Gerard De Haan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this

Twenty-sixth Day of October, 2010

David J. Kappos
*Director of the United States Patent and Trademark Office*